F. ECAUBERT.
ARBOR BEARING FOR TIMEPIECE MOVEMENTS.
APPLICATION FILED NOV. 4, 1918.
1,371,022. Patented Mar. 8, 1921.
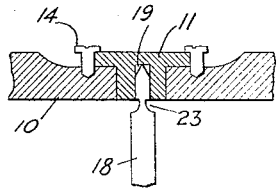
Fig. 1
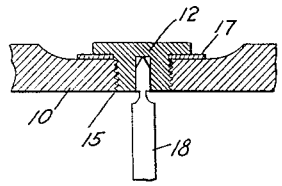
Fig. 2
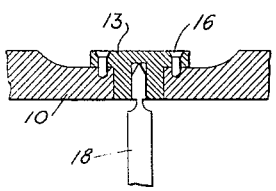
Fig. 3
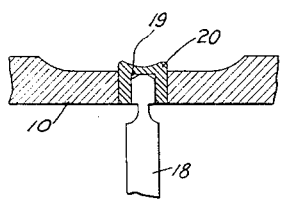
Fig. 4
Fig. 7
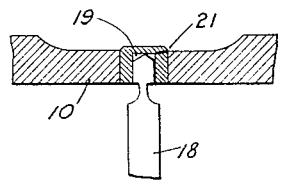
Fig. 5
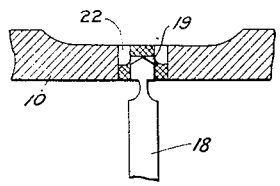
Fig. 6
Inventor
Frederic Ecaubert
By his Attorneys
Knight Bro

UNITED STATES PATENT OFFICE.

FREDERIC ECAUBERT, OF NEW YORK, N. Y.

ARBOR-BEARING FOR TIMEPIECE-MOVEMENTS.

1,371,022.  Specification of Letters Patent.  Patented Mar. 8, 1921.

Application filed November 4, 1918. Serial No. 261,091.

*To all whom it may concern:*

Be it known that I, FREDERIC ECAUBERT, a citizen of the United States, residing in the city, county, and State of New York, have invented certain new and useful Improvements in Arbor-Bearings for Timepiece-Movements, of which the following is a full and clear specification.

My invention relates in general to the arbors and bearings of wheels in time piece movements as, for example, in the staff of balance wheels, escapement wheels and other wheels.

This invention is especially adapted to replace the expensive jewel bearings in watch movements, with a cheaper form of bearing and at the same time to avoid certain structural disadvantages inherent to the jewel bearings. On account of the physical character of the jewels commonly employed, the jewel bearings are large in comparison with the size of the shaft or arbor which bears in them. Jewel bearings for watch movements are usually constructed in two parts, one surrounding the cylindrical end of the arbor to form a side bearing and the other extending across the end of the arbor to take the end thrust. As this material is brittle, the side bearing member must have thick walls to prevent splitting.

An important object of the invention is to provide a bearing member of small outside dimensions and one which will be adapted to serve as a receptacle for oil by which the parts are maintained in good lubricated condition for an indefinitely long period of time. Another object is to provide hardened metallic bearing surfaces which are readily adjustable and preferably dustproof.

In the construction of the parts contemplated by the present invention the outside diameter of the bearing member may be but slightly larger than the arbor which it receives. Furthermore the bearing member is in the form of a cap or cup comprising hardened interior surfaces forming end thrust and side bearings, the dimensions and conformation of the cup with respect to the end of the arbor being such as to provide an end thrust bearing surface of small area close to the axis. This peculiar form at the same time provides an oil chamber between the end of the arbor and the sides engaging the bearing. This oil chamber may be small enough to maintain the oil therein by suction and capillary attraction against gravity effect, no matter what position the timepiece may assume. In furtherance of this purpose, the diameter of the arbor is preferably reduced abruptly at about the plane where it leaves the bearing cup so as to provide a more or less sharp corner or edge over which the oil refuses to pass out of the bearing cup, and by which the tendency of centrifugal force to withdraw the oil from the cup is entirely avoided.

The accompanying drawing illustrates several embodiments of the invention which are to be taken as merely examples and not in any way intended to indicate restriction of the scope of invention to the precise forms.

In said drawing,

Figures 1, 2 and 3 are central sections taken longitudinally of the arbor showing different constructions of securing the bearing cup in its supporting plate;

Figs. 4, 5 and 6 are similar views of different forms of bearing cups which are assumed to be adjustably fitted tightly into a receiving orifice provided in the supporting plate, no special retaining means being employed but friction being relied upon to hold the cup in place;

Fig. 7 is a detail top plan of a bearing cup shown in Fig. 6.

Referring to all the figures, 10 indicates the supporting plate which may, for example, be the bridge piece of a balance wheel mounting. In Figs. 1, 2 and 3 the cup 11, 12 or 13 is secured in the supporting plate by the screws 14, threading 15 or screws 16, respectively, the screws 14 engaging by their head flanges the top flange of the cup 11, the threading 15 being secured in a tapped aperture while the screws 16 are threaded into the supporting plate 10 and retain the cup 13 thereon by passing through apertures in the top flange thereof. A washer or gasket 17 may be employed in any of these forms to provide adjustment. In each embodiment the interior surfaces of the transverse and side walls of the cup are hardened, the cup being for this purpose formed of suitable metal. The arbor 18 in all embodiments is approximately conical at its end to provide a limited axial thrust bearing surface around which is an oil space 19. The interior cavity of the cup is preferably of general cylindrical formation so as to provide with the conical end of the arbor 18 the desired chamber for the oil. Referring to Fig. 4, cup 20 is of plane cylindrical form open at one end to receive the end of the arbor 18 but otherwise entirely closed so that the oil space 19 therein is entirely dustproof. This same dustproof feature is embodied in Figs. 1, 2 and 3. The concave outer end of the cup 20, shown in Fig. 4, provides for the application of pressure locally against the periphery so as to avoid danger of displacing the transverse wall when inserting the cup in the bridge piece, and also provides a spherical surface which may be readily polished without disfiguring the surrounding metal. In Figs. 5 and 6, the generally similar form of cup to that shown in Fig. 4 is modified by having the saw cut 21 leading from the oil chamber 19 (Fig. 5) or the side bores 22 leading into the oil chamber 19 (Fig. 6). In the form shown in Fig. 5, the saw cut 21 may be closed by driving the cup 19 far enough into the supporting plate 10, while in the form shown in Fig. 6 it may be assumed that the oil chamber 19 remains open or may be otherwise closed. In either of these two embodiments, however, the specially formed opening into the oil chamber 19 provides passageway for introducing oil without removing arbor 18, whereas in the embodiments shown in Figs. 1 to 4, the oil is introduced into the cup prior to insertion of the arbor therein.

It will be observed in all figures that the diameter of the arbor 18 is abruptly reduced at 23 to form a more or less sharp corner or edge over which the travel of oil from the cup along the surface of the arbor is arrested. Not only does the reduction in diameter provide the sharp corner referred to but it further affords an effective remedy against centrifugal force coming into play to remove oil from the cup during the oscillation or rotation of the arbor.

While I have shown in most of the figures a conical end terminating in a point at the axis of the arbor it will, of course, be understood that this may be modified by providing an appreciable area at the end of the arbor to take the thrust as shown, for example, in Fig. 4.

In Figs. 4, 5 and 6 an adjustment is accomplished by driving or pressing the cup inward or outward in its supporting plate 10.

I claim:

1. An arbor bearing member for time piece movements comprising a metallic cup having the interior surfaces of the transverse and side walls hardened to form integral thrust and side bearings, the outer end of said cup being concave.

2. In a time piece movement, the combination with a bridge piece, and a unitary metallic bearing cup mounted therein, said cup having a generally cylindrical interior space and having its inner walls hardened to form integral end thrust and side bearings; of an arbor having a generally cylindrical end portion fitting within said bearing cup, the cylindrical surfaces of the two members conforming with each other while the end surface of the arbor contacts with the inner transverse wall of the cup only at a relatively small portion about the axis, leaving between the end thrust bearing and the side bearing surfaces a chamber small enough to retain oil by capillary attraction.

3. In a time piece movement, the combination with a bridge piece, and a unitary metallic bearing cup mounted therein, having a generally cylindrical interior space, the inner walls of said cup being hardened to form integral end thrust and side bearings; of an arbor having a generally cylindrical end portion terminating in a substantially conical end surface, said arbor adapted to fit within said bearing cup with the cylindrical surface of the one conforming with the cylindrical surface of the other and with the conical end surface of the arbor contacting with the inner transverse wall of the cup to limit axial play of the arbor within the cup while at the same time leaving between the end thrust portion and the side bearing surfaces a chamber small enough to retain oil by capillary attraction.

4. In a time piece movement, the combination with an arbor having a substantially conical end surface, of a bridge piece, a metallic cup mounted in said bridge piece having a generally cylindrical interior space adapted to receive the end of said arbor and having its interior surfaces hardened to provide thrust and side bearing surfaces, said arbor having its diameter reduced abruptly at substantially the plane at which it emerges from said cup, the outer end of said cup being concave.

5. In a time piece movement, a cup member having a well therein and an arbor adapted to fit the well in the cup member and having its end constructed to bear against the base of the well to provide an end thrust bearing for the arbor and an annular lubricant chamber in the well at the base of the arbor, the diameter of the well and that of the arbor being sufficiently small to cause the action of capillary attraction to overcome the action of gravity in order to prevent the escape of the lubricant from the bearing.

FREDERIC ECAUBERT.